US012573710B2

(12) United States Patent
Jiang

(10) Patent No.: US 12,573,710 B2
(45) Date of Patent: Mar. 10, 2026

(54) BATTERY PACK, METHOD FOR MANUFACTURING BATTERY PACK, AND VEHICLE

(71) Applicant: Xiaomi EV Technology Co., Ltd., Beijing (CN)

(72) Inventor: Yimiao Jiang, Beijing (CN)

(73) Assignee: Xiaomi EV Technology Co., Ltd., Beijing (CN)

( * ) Notice: Subject to any disclaimer, the term of this patent is extended or adjusted under 35 U.S.C. 154(b) by 660 days.

(21) Appl. No.: 17/974,943

(22) Filed: Oct. 27, 2022

(65) Prior Publication Data
US 2024/0039108 A1     Feb. 1, 2024

(30) Foreign Application Priority Data

Jul. 28, 2022     (CN) .......................... 202210901667.3

(51) Int. Cl.
| | |
|---|---|
| *H01M 50/35* | (2021.01) |
| *H01M 50/209* | (2021.01) |
| *H01M 50/244* | (2021.01) |
| *H01M 50/249* | (2021.01) |
| *H01M 50/271* | (2021.01) |
| *H01M 50/291* | (2021.01) |

(52) U.S. Cl.
CPC ......... *H01M 50/35* (2021.01); *H01M 50/209* (2021.01); *H01M 50/244* (2021.01); *H01M 50/249* (2021.01); *H01M 50/271* (2021.01); *H01M 50/291* (2021.01); *H01M 2220/20* (2013.01)

(58) Field of Classification Search
None
See application file for complete search history.

(56) References Cited

U.S. PATENT DOCUMENTS

2018/0337377 A1* 11/2018 Stephens ............. H01M 50/224

FOREIGN PATENT DOCUMENTS

| | | |
|---|---|---|
| CN | 108666464 A | 10/2018 |
| CN | 110392945 B | 10/2019 |
| CN | 110690492 A | 1/2020 |
| CN | 111653701 A | 9/2020 |

(Continued)

OTHER PUBLICATIONS

Machine Translation of WO-2021073387-A1 (Year: 2021).*

(Continued)

*Primary Examiner* — Gregg Cantelmo
(74) *Attorney, Agent, or Firm* — Volpe Koenig

(57) ABSTRACT

A battery pack includes a battery pack casing, a battery cell, a barrier assembly and a filling layer, the battery cell is located in the battery pack casing and has a pole end face and an explosion-proof valve on the pole end face; the barrier assembly is installed on the battery cell and is between the pole end face and an inner surface of the battery pack casing, the inner surface of the battery pack casing, the pole end face and the barrier assembly jointly define an exhaust channel, and the explosion-proof valve is in the exhaust channel; and the filling layer is located outside the exhaust channel and is used for filling a gap between at least part of an outer surface of the battery cell and at least part of the inner surface of the battery pack casing, the filling layer is made of an adhesive colloid.

18 Claims, 7 Drawing Sheets

(56)            References Cited

FOREIGN PATENT DOCUMENTS

| | | | |
|---|---|---|---|
| CN | 112421088 A | 2/2021 | |
| EP | 2199133 A2 * | 6/2010 | ............. B60L 50/66 |
| EP | 3806188 A1 | 4/2021 | |
| EP | 3930027 A1 | 12/2021 | |
| JP | 2015-195131 A | 11/2015 | |
| JP | 2019032992 A * | 2/2019 | ........ H01M 10/6567 |
| JP | 2020-123516 A | 8/2020 | |
| WO | WO-2021073387 A1 * | 4/2021 | .......... H01M 50/209 |

OTHER PUBLICATIONS

Abstract of JP-2019032992-A (Year: 2019).*
Extended European Search Report issued on Aug. 29, 2023 for European Patent Application No. 22204726.8.

* cited by examiner

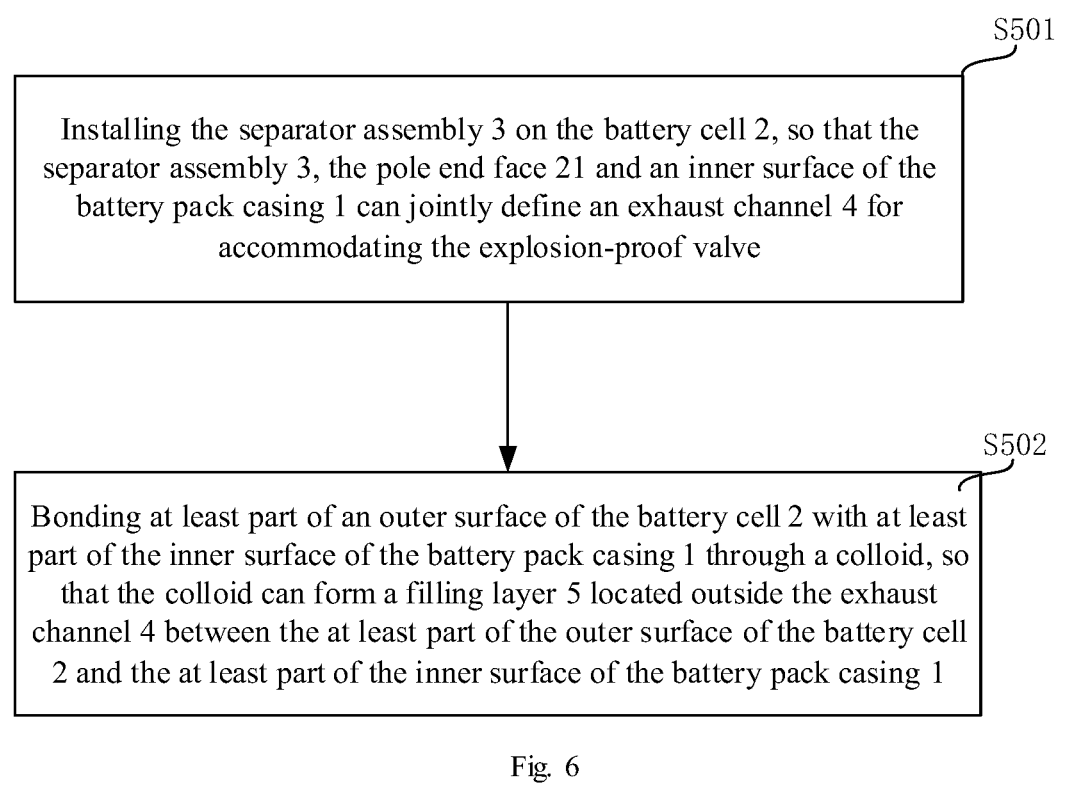

S501

Installing the separator assembly 3 on the battery cell 2, so that the separator assembly 3, the pole end face 21 and an inner surface of the battery pack casing 1 can jointly define an exhaust channel 4 for accommodating the explosion-proof valve

S502

Bonding at least part of an outer surface of the battery cell 2 with at least part of the inner surface of the battery pack casing 1 through a colloid, so that the colloid can form a filling layer 5 located outside the exhaust channel 4 between the at least part of the outer surface of the battery cell 2 and the at least part of the inner surface of the battery pack casing 1

Fig. 6

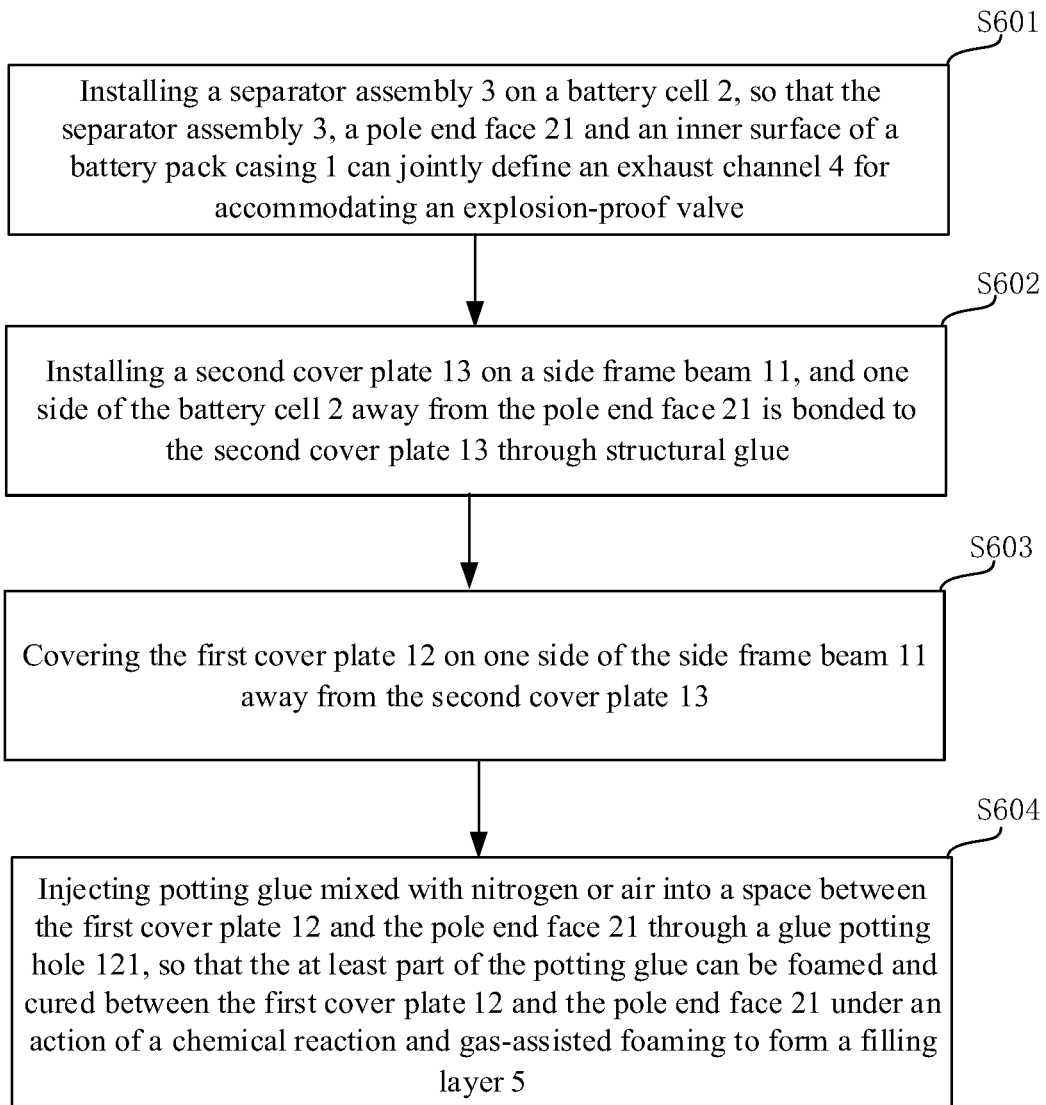

S601

Installing a separator assembly 3 on a battery cell 2, so that the separator assembly 3, a pole end face 21 and an inner surface of a battery pack casing 1 can jointly define an exhaust channel 4 for accommodating an explosion-proof valve

S602

Installing a second cover plate 13 on a side frame beam 11, and one side of the battery cell 2 away from the pole end face 21 is bonded to the second cover plate 13 through structural glue

S603

Covering the first cover plate 12 on one side of the side frame beam 11 away from the second cover plate 13

S604

Injecting potting glue mixed with nitrogen or air into a space between the first cover plate 12 and the pole end face 21 through a glue potting hole 121, so that the at least part of the potting glue can be foamed and cured between the first cover plate 12 and the pole end face 21 under an action of a chemical reaction and gas-assisted foaming to form a filling layer 5

Fig. 7

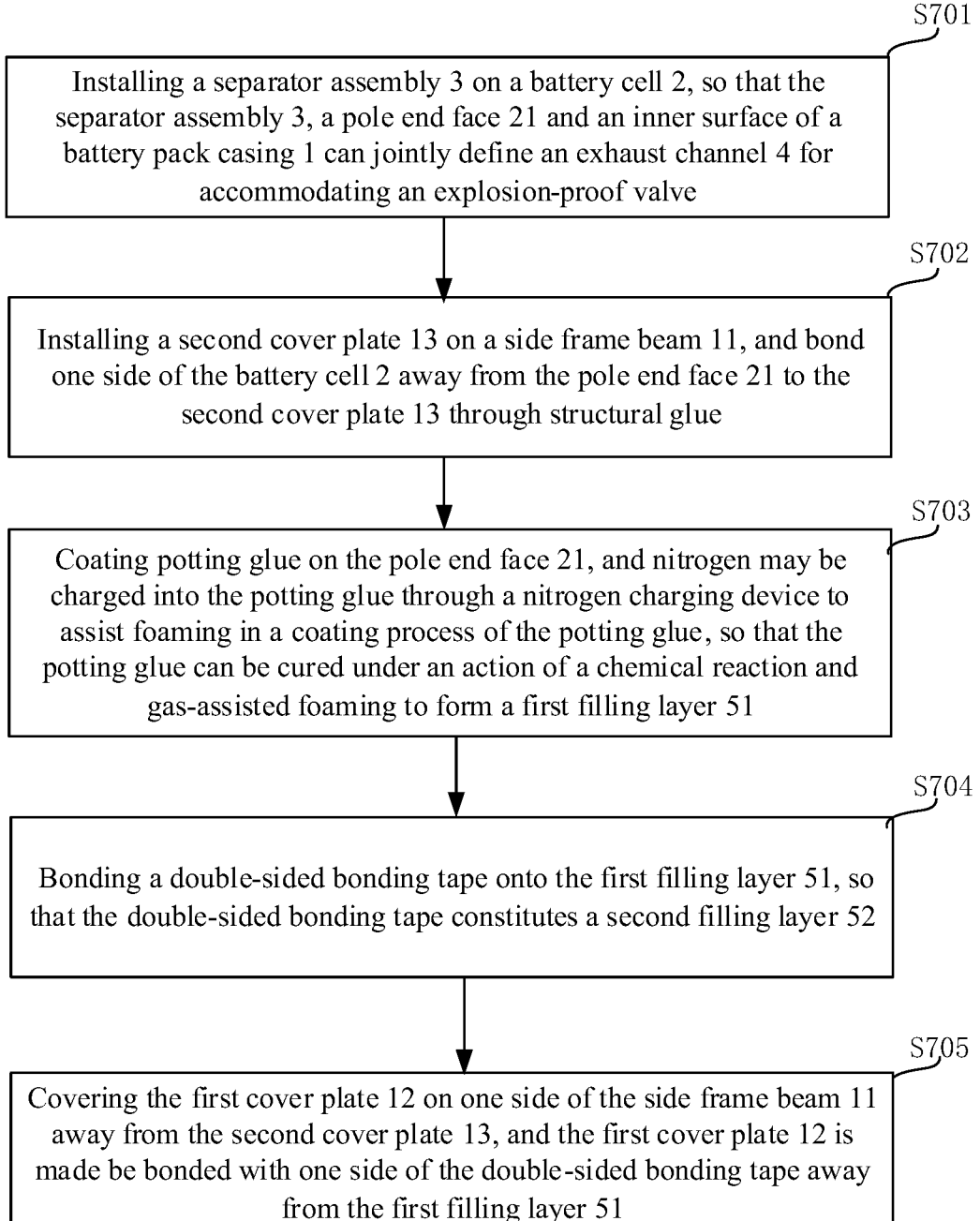

S701

Installing a separator assembly 3 on a battery cell 2, so that the separator assembly 3, a pole end face 21 and an inner surface of a battery pack casing 1 can jointly define an exhaust channel 4 for accommodating an explosion-proof valve

S702

Installing a second cover plate 13 on a side frame beam 11, and bond one side of the battery cell 2 away from the pole end face 21 to the second cover plate 13 through structural glue

S703

Coating potting glue on the pole end face 21, and nitrogen may be charged into the potting glue through a nitrogen charging device to assist foaming in a coating process of the potting glue, so that the potting glue can be cured under an action of a chemical reaction and gas-assisted foaming to form a first filling layer 51

S704

Bonding a double-sided bonding tape onto the first filling layer 51, so that the double-sided bonding tape constitutes a second filling layer 52

S705

Covering the first cover plate 12 on one side of the side frame beam 11 away from the second cover plate 13, and the first cover plate 12 is made be bonded with one side of the double-sided bonding tape away from the first filling layer 51

Fig. 8

BATTERY PACK, METHOD FOR MANUFACTURING BATTERY PACK, AND VEHICLE

CROSS REFERENCE TO RELATED APPLICATION

The present application claims the benefit of priority to Chinese Application No. 202210901667.3, filed on Jul. 28, 2022, the contents of which are incorporated herein by reference in their entireties for all purposes.

BACKGROUND

An explosion-proof valve of a battery cell in a battery pack needs to be exhausted during working to ensure safety of the battery cell. Thus, in the related art, there are gaps between most positions of the battery cell and the battery pack casing, resulting in a low connection strength between the battery pack casing and the battery cell, which in turn leads to problems of low overall strength and poor load-bearing capacity of the battery pack.

SUMMARY

The objective of the disclosure is to provide a battery pack, a method for manufacturing the battery pack, and a vehicle, so as to solve technical problems existing in the related art.

In order to achieve the above objective, a first aspect of the disclosure provides a battery pack, including:

a battery pack casing;

a battery cell, located in the battery pack casing, and having a pole end face and an explosion-proof valve disposed on the pole end face;

a barrier assembly, installed on the battery cell and between the pole end face and an inner surface of the battery pack casing, where the inner surface of the battery pack casing, the pole end face and the barrier assembly jointly define an exhaust channel, and the explosion-proof valve is in the exhaust channel; and a filling layer, being outside the exhaust channel and used for filling a gap between at least part of an outer surface of the battery cell and at least part of the inner surface of the battery pack casing, where the filling layer is made of an adhesive colloid, so that the at least part of the outer surface of the battery cell can be bonded with the at least part of the inner surface of the battery pack casing through the filling layer.

A second aspect of the disclosure provides a method for manufacturing a battery pack. The battery pack includes a battery pack casing, a battery cell and a barrier assembly, the battery cell has a pole end face and an explosion-proof valve on the pole end face, and the method for manufacturing the battery pack includes:

installing the barrier assembly on the battery cell, so that the barrier assembly, the pole end face and an inner surface of the battery pack casing can jointly define an exhaust channel for accommodating the explosion-proof valve; and bonding at least part of an outer surface of the battery cell with at least part of the inner surface of the battery pack casing through a colloid, so that the colloid can form a filling layer located outside the exhaust channel between the at least part of the outer surface of the battery cell and the at least part of the inner surface of the battery pack casing.

A third aspect of the disclosure provides a vehicle including the battery pack described in the first aspect.

Other features and advantages of the disclosure will be illustrated in detail in the subsequent detailed description part.

BRIEF DESCRIPTION OF THE DRAWINGS

The accompanying drawings are used to provide a further understanding of the disclosure, constitute a part of the specification, are used to explain the disclosure together with the detailed description below, but do not constitute a limitation to the disclosure. In the accompanying drawings:

FIG. 6 is a flowchart of a method for manufacturing a battery pack provided by an example implementation of the disclosure.

FIG. 7 is a flowchart of a method for manufacturing a battery pack provided by another example implementation of the disclosure.

FIG. 8 is a flowchart of a method for manufacturing a battery pack provided by another example implementation of the disclosure.

DETAILED DESCRIPTION

Figure 1:
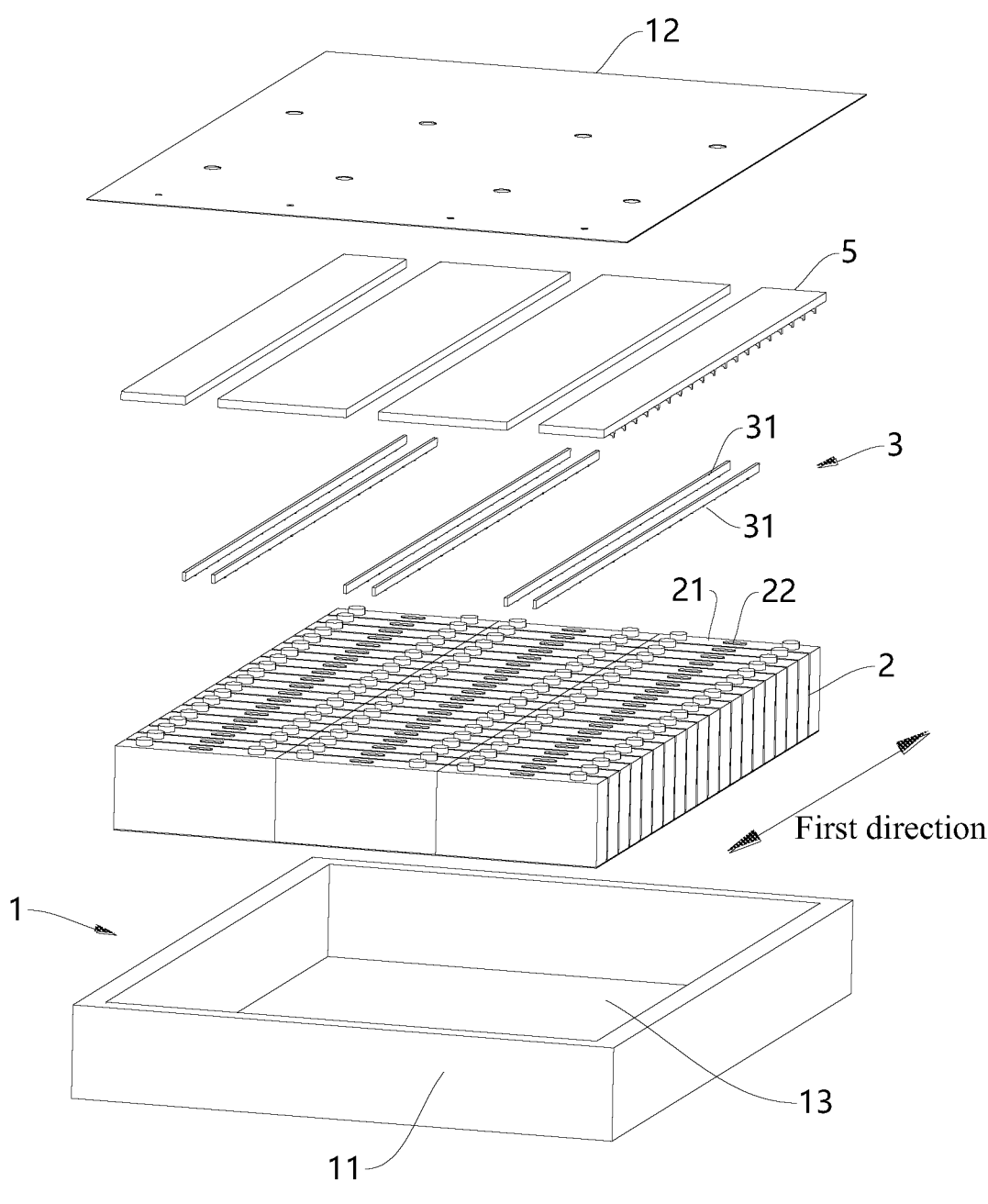
FIG. 1 is an exploded view of a battery pack provided by an example implementation of the disclosure.
Figure 2:
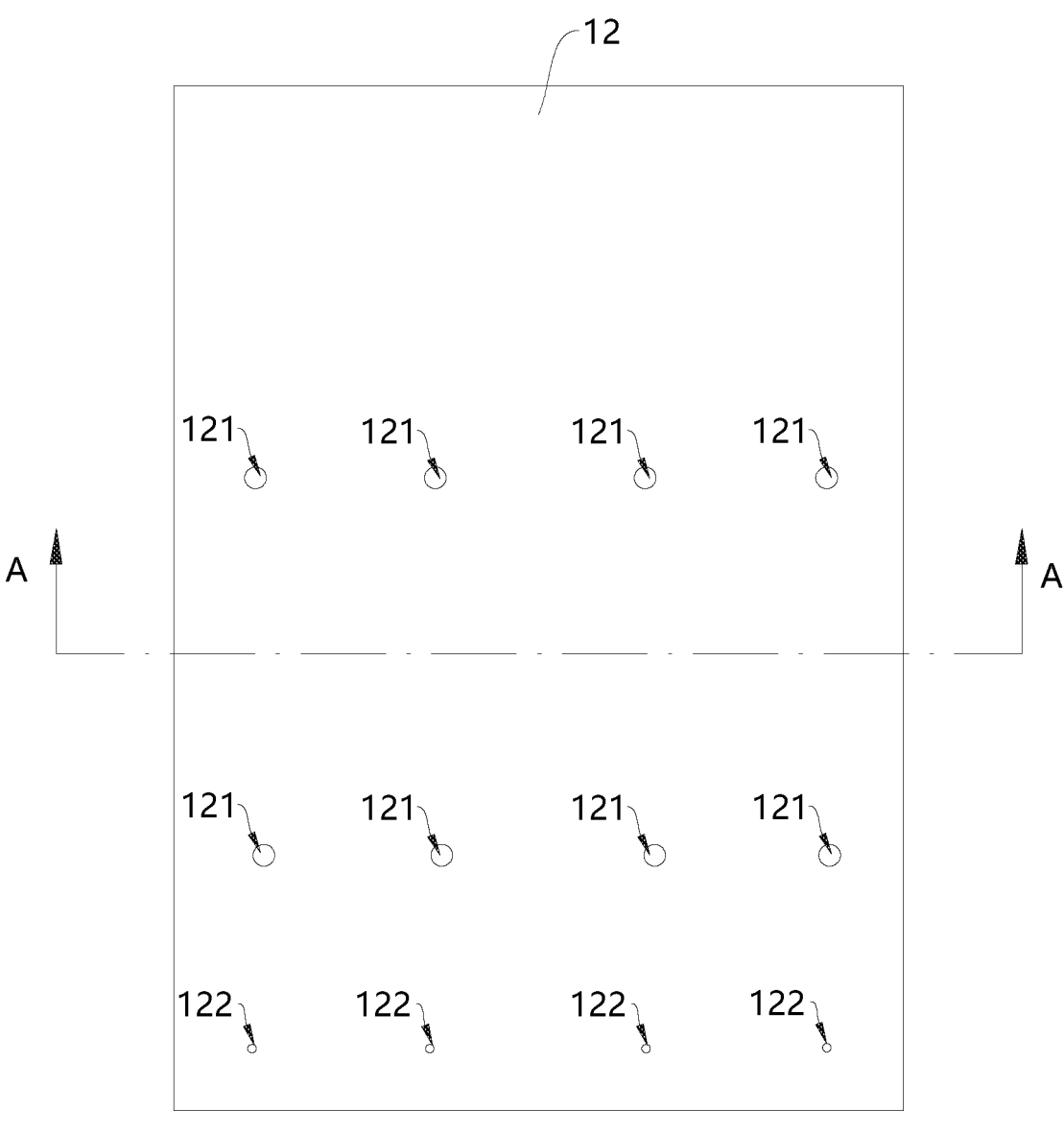
FIG. 2 is a top view of a battery pack provided by an example implementation of the disclosure.
Figures 3, 4:
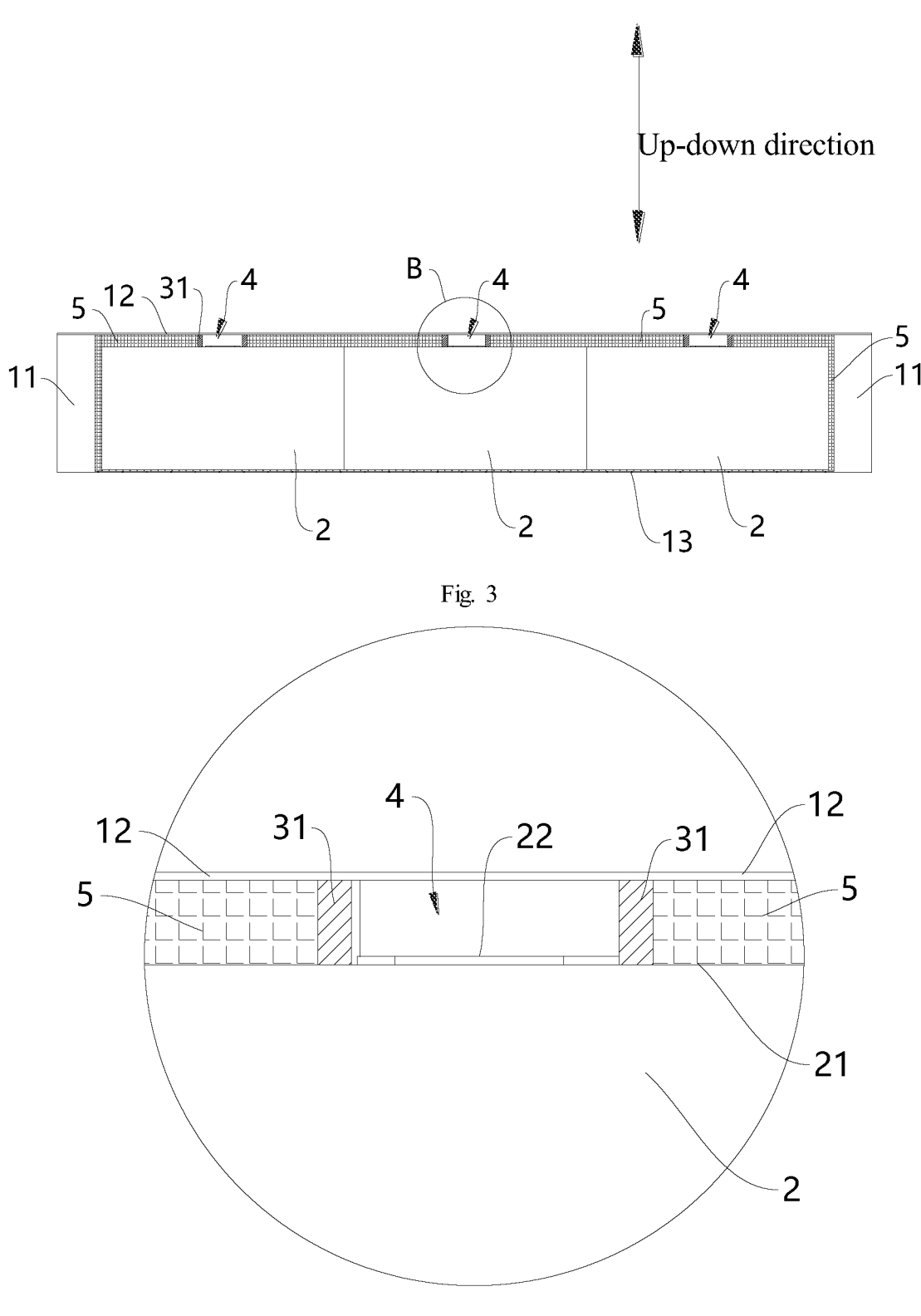
FIG. 3 is a sectional view taken along a line "A-A" in FIG. 2.
FIG. 4 is an enlarged view of a part "B" in FIG. 3.
Figure 5:
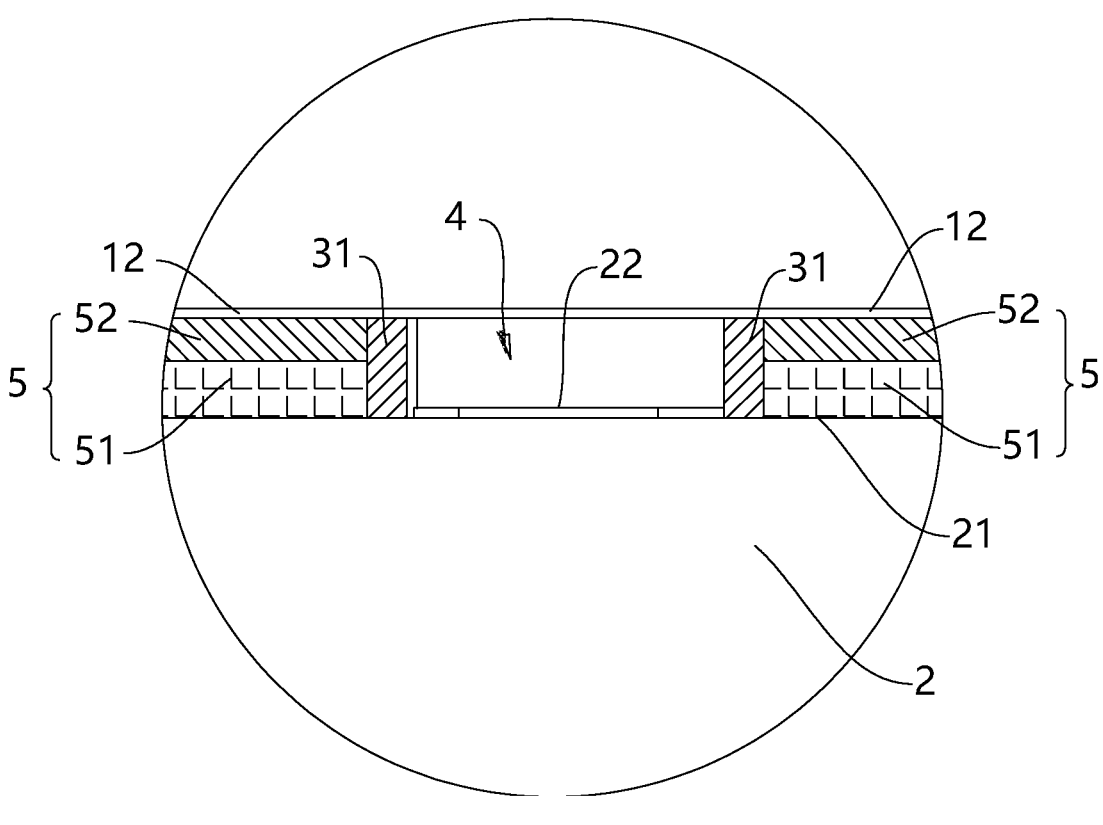
FIG. 5 is a partial enlarged view of a battery pack provided by another example implementation of the disclosure.

The specific implementations of the disclosure are illustrated in detail below with reference to the accompanying drawings. It should be understood that the specific implementation described here is merely configured to illustrate and explain the disclosure and not to limit the disclosure.

In the disclosure, unless otherwise stated, directional words such as "top and bottom" refer to a top and bottom of a battery pack in normal use, and an "up-down direction" refers to the up-down direction of the battery pack in normal use, and "inside and outside" refers to the inside and outside of a contour of related parts components. In addition, it should be noted that terms used such as "first," "second," and the like are used to distinguish one element from another and have no order or importance. In addition, in the description with reference to the accompanying drawings, the same reference numerals in the different accompanying drawings represent the same elements.

The disclosure relates to the technical field of batteries, in particular to a battery pack, a method for manufacturing the battery pack, and a vehicle.

In the related art, there is usually a gap between the outer surface of the battery cell of the battery pack and an inner surface of a battery pack casing, and the gap is used for exhausting the explosion-proof valve. The gap is usually disposed between a side portion of the battery cell and the battery pack casing as well as between a pole end face where the battery cell is provided with the explosion-proof valve and the battery pack casing. That is, there are gaps between most positions of the battery cell and the battery pack casing, resulting in a low connection strength between the battery pack casing and the battery cell, which in turn leads to problems of low overall strength and poor load-bearing capacity of the battery pack.

As shown in FIGS. 1-5, a first aspect of the disclosure, provides a battery pack, including a battery pack casing 1, a battery cell 2, a barrier assembly 3 and a filling layer 5. The battery cell 2 is located in the battery pack casing 1 and has a pole end face 21 and an explosion-proof valve 22 disposed on the pole end face 21; the barrier assembly 3 is installed on the battery cell 2 and is located between the pole end face 21 and an inner surface of the battery pack casing 1, the inner surface of the battery pack casing 1, the pole end face 21 and the barrier assembly 3 jointly define an exhaust channel 4, and the explosion-proof valve 22 is located in the exhaust channel 4; and the filling layer 5 is located outside the exhaust channel 4 and is used for filling a gap between at least part of an outer surface of the battery cell 2 and at least part of the inner surface of the battery pack casing 1, and the filling layer 5 is made of an adhesive colloid so that the at least part of the outer surface of the battery cell 2 can be bonded with the at least part of the inner surface of the battery pack casing 1 through the filling layer 5.

Through the above technical solution, since the barrier assembly 3 is located between the pole end face 21 and the inner surface of the battery pack casing 1, the exhaust channel 4 for exhausting the explosion-proof valve 22 is jointly defined by the inner surface of the battery pack casing 1, the pole end face 21 and the barrier assembly 3, and the filling layer 5 is located outside the exhaust channel 4 and can fill the gap between the at least part of the outer surface of the battery cell 2 and the at least part of the inner surface of the battery pack casing 1, so that the at least part of the outer surface of the battery cell 2 can be bonded with the inner surface of the at least part of the battery pack casing 1 through the filling layer 5, which improves installation stability between the battery cell 2 and the battery pack casing 1, and ensures that the battery cell 2 and the battery pack casing 1 can be stably connected. Moreover, the force can be transferred between the at least part of the outer surface of the battery cell 2 and the at least part of the battery pack casing 1 through the filling layer 5, and when the battery pack casing 1 is subjected to an external force, the external force can be transferred to the battery cell 2 through the filling layer 5 for dispersion. Thus, a force transferring path of the battery pack casing 1 under the action of the external force is increased, and the overall strength of the battery pack can be improved.

Compared with the technical solution in the related art that a gap used for exhausting of an explosion-proof valve is located between a side portion of a battery cell and a battery pack casing as well as between a pole end face of the battery cell provided with the explosion-proof valve and the battery pack casing, that is, there is a gap between most of the position of the battery cell and the battery pack casing. In the examples provided by this disclosure, the exhaust channel 4 is located between the pole end face 21 and the inner surface of the battery pack casing 1, and the filling layer 5 can be disposed at positions other than the exhaust channel 4 to connect the battery cell 2 with the battery pack casing 1, so that the connection position and the connection area between the battery cell 2 and the battery pack casing 1 are increased, and the connection stability between the battery cell 2 and the battery pack casing 1 is stronger. The barrier assembly 3 can prevent the filling layer 5 from entering the exhaust channel 4 to block or close the explosion-proof valve 22 and affect the exhausting of the explosion-proof valve 22.

The above filling layer 5 is located outside the exhaust channel 4 and is used for filling the gap between the at least part of the outer surface of the battery cell 2 and the at least part of the inner surface of the battery pack casing 1, which means that the filling layer 5 can at least partially fill any position outside of exhaust channel 4. For example, in an implementation scenario where the battery pack casing 1 includes an upper cover plate, a side frame beam 11 and a lower tray, the filling layer 5 can be filled to gaps between the upper cover plate and the battery cell 2, between the side frame beam 11 and the battery cell 2 and/or between the lower tray and the battery cell 2. The filling layer 5 can further be filled to the gap between the battery cell 2 and the battery cell 2. The disclosure does not specifically limit the disposing position of the filling layer 5.

As an example implementation scenario, the top of the above battery pack can be used as a floor panel of a vehicle, that is, the top of the battery pack casing 1 can be used to withstand a pressure of the passenger compartment. Because the at least part of the outer surface of the battery cell 2 can be bonded to the at least part of the inner surface of the battery pack casing 1 through the filling layer 5, the force of the passenger compartment received by the battery pack casing 1 can be transferred to the battery cell 2 through the filling layer 5, so as to disperse the external force and ensure that the battery pack can have good strength and load-bearing properties. In some examples, the top of the battery pack casing 1 may be integrated with a seat beam, and the top of the battery pack casing 1 is used as the floor panel of the vehicle. In the above example, the external force on the seat beam can be transferred to the battery cell 2 through the battery pack casing 1 and the filling layer 5, so as to disperse the external force so that the battery pack casing 1 has a good load-bearing property.

In the example in which the filling layer 5 is located below the battery cell 2, the pole end face 21 of the battery cell 2 is disposed downward, and the at least part of the filling layer 5 is located between the pole end face 21 of the battery cell 2 and the lower tray of the battery pack casing 1. The filling layer 5 can increase the force transferring path between the lower tray and the battery cell 2, and transfer the external force received by the lower tray to the battery cell 2 through the filling layer 5 for dispersion, and thus deformation of the lower tray under force is reduced, so that the lower tray can play a good bottom protection role for the battery pack.

A plurality of battery cells 2 are usually installed in the battery pack, and each battery cell 2 is provided with the explosion-proof valve 22. In order to enable each explosion-proof valve 22 to be exhausted through the exhaust channel 4 and reduce the complexity of the barrier assembly 3, as shown in FIG. 1, In some examples, the battery pack may have at least one battery cell group, the battery cell group includes the plurality of battery cells 2 disposed in the first direction of the battery pack casing 1, and the explosion-proof valves 22 of the plurality of battery cells 2 in the battery cell group are arranged at intervals in the first direction, and the barrier assemblies 3 are arranged in a one-to-one correspondence with the battery cell groups. The first direction here may be a front-rear direction or a left-right direction of the battery pack, which is not limited in the disclosure. The barrier assemblies 3 are arranged in one-to-one correspondence with the battery cell groups; that is, each battery cell group can form the exhaust channel 4 with the barrier assembly 3, so as to realize the exhausting of the battery cells 2. The explosion-proof valves 22 of the battery cells 2 in the battery cell group are arranged at intervals in the first direction, and two of the plurality of explosion-proof valves 22 are respectively provided with partition plates 31. That is, the plurality of explosion-proof valves 22 communicate to the same exhaust channel 4. Thus a sharing rate of the barrier assemblies 3 is increased, and the complexity of an internal structure of the battery pack is reduced.

In some examples, the barrier assemblies 3 may include partition plates 31, the partition plates 31 extend in the first direction, and the plurality of explosion-proof valves 22 in the battery cell group are respectively provided with the two partition plates 31 on two sides of a second direction perpendicular to the first direction. As an example implementation, two ends of the partition plates 31 in the first direction abut against the inner surface of the battery pack casing 1, respectively, so that the two partition plates 31 and the inner surface of the battery pack casing 1 can constitute a closed structure, so as to separate the explosion-proof valves 22 in the battery cell groups and the filling layer 5 outside the partition plates 31.

As another example implementation, the barrier assemblies 3 may include end plates, the end plates extend in the second direction, and the two end plates are respectively disposed on two sides of the plurality of explosion-proof valves 22 in the battery cell group in the first direction. The two partition plates 31 and the two end plates corresponding to the battery cell group jointly constitute an annular closed structure surrounding the plurality of explosion-proof valves 22 in the battery cell group, so as to partition the explosion-proof valves 22 in the battery cell group and the filling layer 5 outside the partition plates 31.

In order to facilitate the fixing of the barrier assemblies 3, in some examples, first bonding glue may be disposed on one side of the barrier assemblies 3 close to the explosion-proof valves 22, and the barrier assemblies 3 are bonded to side portions of the explosion-proof valves 22 through the first bonding glue, so as to realize the fixing between the barrier assemblies 3 and the explosion-proof valves 22.

In some examples, second bonding glue may be disposed on one side of the barrier assemblies 3 close to the pole end face 21, and the barrier assemblies 3 are bonded to the pole end face 21 through the second bonding glue so as to realize the fixing between the barrier assemblies 3 and the pole end face 21 of the battery cells 2.

A shape of the above partition plates 31 may be formed in any shape. For example, in an example where the battery cell 2 or the battery cell group has a recess or a gap, in order to ensure that the barrier assembly 3 can play a good partition effect and ensure the independence of the exhaust channel 4, a lower end of the barrier assembly 3 may be formed with a sealing protrusion, which is matched with the recess or the gap between the battery cells 2, so as to be able to partition the exhaust channel 4 from the filling layer 5. The disclosure does not limit the specific shape and structure of the partition plate 31.

In some examples, the battery pack casing 1 may include a side frame beam 11, and a first cover plate 12 and a second cover plate 13 oppositely disposed in an up-down direction of the side frame beam 11, the side frame beam 11, the first cover plate 12 and the second cover plate 13 jointly surround an accommodation space for accommodating the battery cells 2, the explosion-proof valves 22 are disposed close to the first cover plate 12, the at least part of the filling layer 5 is located between the first cover plate 12 and the pole end face 21, and one end of the battery cells 2 away from the pole end face 21 is bonded to the second cover plate 13 through structural glue.

In the above example, the first cover plate 12 may be an upper cover plate in the battery pack casing 1 close to a passenger compartment or may be a lower tray in the battery pack casing 1 away from the passenger compartment. That is, in the practical implementation of the above battery pack, the explosion-proof valves 22 of the battery cells 2 may be arranged toward the upper cover plate close to the passenger compartment, or may be arranged toward the lower tray away from the passenger compartment, which is not limited in the disclosure.

Since the at least part of the filling layer 5 is located between the first cover plate 12 and the pole end face 21, one end of the battery cells 2 away from the pole end face 21 is bonded to the second cover plate 13 through the structural glue, that is, the first cover plate 12, the filling layer 5 and the battery cells 2 constitute as a whole by the structural glue and the second cover plate 13. When any one of the first cover plate 12 or the second cover plate 13 is subjected to the external force, the external force can be dispersed to another cover plate through the battery cells 2, so as to realize the transferring and dispersion of the external force and improve the load-bearing capacity of the battery pack.

As an example implementation scenario, the first cover plate 12 may be the upper cover plate in the battery pack casing 1 close to the passenger compartment, the at least part of the filling layer 5 is located between the upper cover plate and the pole end face 21 of the battery cells 2, one end of the battery cells 2 away from the pole end face 21 is bonded to the lower tray through the structural glue, and the lower tray here may include a liquid cooling plate. In the example in which the lower tray includes the liquid cooling plate, one end of the battery cells 2 away from the pole end face 21 is bonded to the liquid cooling plate through the structural glue. When the upper cover plate of the battery pack casing 1 is under the pressure of the passenger compartment, the external force can be transferred to the lower tray through the filling layer 5, the battery cells 2 and the structural glue, so as to disperse the external force. The overall strength of the battery pack is high and the load-bearing capacity is strong, which improves the overall mechanical performance of the vehicle.

The above filling layer 5 may be fabricated by a potting process. In some examples, a glue potting hole 121 is formed in the first cover plate 12, the colloid is potting glue, and the glue potting hole 121 is used for injecting the potting glue into a space between the first cover plate 12 and the pole end face 21, so that the at least part of the potting glue can be cured between the first cover plate 12 and the pole end face 21 to form the filling layer 5.

In order to facilitate monitoring of the colloid during the potting process, in some examples, an observation hole 122 is further formed in the first cover plate 12, and the observation hole 122 is disposed close to the side frame beam 11. When the colloid overflows from the observation hole 122, an operator may stop the potting, so as to monitor the colloid in the battery pack casing 1 to avoid waste of the colloid. In addition, the observation hole 122 here can also be used for exhausting during the curing process of the potting glue, so as to avoid gas accumulation inside the battery pack casing. In some examples, the observation hole 122 may be blocked by a sealant or a blocking block.

In some examples, the filling layer 5 may include a first filling layer 51 and a second filling layer 52, the colloid includes the potting glue and a double-sided bonding tape, and the pole end face 21 is coated with the potting glue, so that the potting glue can be cured on the pole end face 21 and form the first filling layer 51; and one side of the double-sided bonding tape is bonded with the first filling layer 51, the other side of the double-sided bonding tape is bonded with the first cover plate 12, and the double-sided bonding tape constitutes the second filling layer 52.

In order to ensure lightweight of the battery pack and the good stiffness of the battery pack, in some examples, the potting glue may be made of a material with a density of 0.2 g/cm3 to 0.7 g/cm3, a bonding strength of 0.5 MPa to 2 MPa, and an elastic modulus of 0.1 MPa to 200 MPa. The filling layer formed by the above potting glue has low density, high bonding strength, and good elastic performance and force transferring ability, and the battery cell and the battery pack casing can be stably connected, so that the battery pack has good strength and load-bearing capacity.

As an example implementation, the potting glue may be made of a polyurethane foam material.

In some examples, a heat-resistant material is added to the potting glue, so that the heat conductivity of the potting glue can be equal to or lower than 0.1 W/mK. The filling layer formed by the potting glue has good heat-resistant performance, which can improve the safety of the battery pack and prevent the temperature of the battery pack from being too high.

In some examples, the above heat-resistant material may be glass beads.

As shown in FIGS. 6-8, a second aspect of the disclosure provides a method for manufacturing a battery pack. The battery pack includes a battery pack casing 1, a battery cell 2 and a barrier assembly 3. The battery cell 2 has a pole end face 21 and an explosion-proof valve 22 disposed on the pole end face 21, and the method for manufacturing the battery pack includes:

S501, installing the barrier assembly 3 on a battery cell 2, so that the barrier assembly 3, the pole end face 21 and an inner surface of the battery pack casing 1 can jointly define an exhaust channel 4 for accommodating the explosion-proof valve;

S502, bonding at least part of an outer surface of the battery cell 2 with at least part of the inner surface of the battery pack casing 1 through a colloid, so that the colloid can form a filling layer 5 located outside the exhaust channel 4 between the at least part of the outer surface of the battery cell 2 and the at least part of the inner surface of the battery pack casing 1.

Through the above manufacturing method, the barrier assembly 3 is installed on the battery cell 2, so that the barrier assembly 3, the pole end face 21 and the inner surface of the battery pack casing 1 can jointly define the exhaust channel 4 for accommodating the explosion-proof valve. The exhaust channel 4 can exhaust the explosion-proof valve 22 of the battery cell 2 to ensure the safety of the battery cell 2. The barrier assembly 3 is installed on the battery cell 2 first, and the exhaust channel 4 can be reserved in advance so as to prevent the subsequent colloid from entering the exhaust channel 4 and affecting the same. At least part of the outer surface of the battery cell 2 is bonded with at least part of the inner surface of the battery pack casing 1 through the colloid, so that connection strength between the battery cell 2 and the battery pack casing 1 can be improved. The colloid can form a filling layer 5 located outside the exhaust channel 4 between the at least part of the outer surface of the battery cell 2 and the at least part of the inner surface of the battery pack casing 1, the at least part of the outer surface of the battery cell 2 and the at least part of the battery pack casing 1 can transfer force through the filling layer 5, which increases a force transferring path of the battery pack casing 1 under the action of external force, and can improve overall strength of the battery pack.

In order to ensure that the barrier assembly 3 can be stably fixed on the battery cell 2, in some examples, installing the barrier assembly 3 on the battery cell 2 includes:

first bonding glue is disposed on one side of the barrier assembly 3 close to the explosion-proof valve 22, and the barrier assembly 3 is made be bonded to a side portion of the explosion-proof valve 22 through the first bonding glue; and/or second bonding glue is disposed on one side of the barrier assembly 3 close to the pole end face 21, and the barrier assembly 3 is made be bonded to the pole end face 21 through the second bonding glue.

In some examples, the battery pack casing 1 includes a side frame beam 11, and a first cover plate 12 and a second cover plate 13 oppositely disposed in an up-down direction of the side frame beam 11, the side frame beam 11, the first cover plate 12 and the second cover plate 13 can jointly surround an accommodation space for accommodating the battery cell 2, a glue potting hole 121 is formed in the first cover plate 12, and the colloid is potting glue.

Before bonding the at least part of the outer surface of the battery cell 2 with the at least part of the inner surface of the battery pack casing 1 through the colloid, the second cover plate 13 is installed on the side frame beam 11, and one side of the battery cell 2 away from the pole end face 21 is bonded to the second cover plate 13 through structural glue.

Bonding at least part of the outer surface of the battery cell 2 with at least part of the inner surface of the battery pack casing 1 through the colloid includes:

the first cover plate 12 is covered on one side of the side frame beam 11 away from the second cover plate 13; and the potting glue is injected into a space between the first cover plate 12 and the pole end face 21 through the glue potting hole 121, so that at least part of the potting glue can be cured between the first cover plate 12 and the pole end face 21 to form the filling layer 5.

In some examples, the potting glue is made of a polyurethane foam material.

Injecting the potting glue into the space between the first cover plate 12 and the pole end face 21 through the potting glue hole 121, so that at least part of the potting glue can be cured between the first cover plate 12 and the pole end face 21 to form the filling layer 5 includes:

injecting the potting glue mixed with nitrogen or air into the space between the first cover plate 12 and the pole end face 21 through the glue potting hole 121, so that the at least part of the potting glue can be foamed and cured between the first cover plate 12 and the pole end face 21 under an action of a chemical reaction and gas-assisted foaming to form the filling layer 5.

In some examples, the battery pack casing 1 includes a side frame beam 11, and a first cover plate 12 and a second cover plate 13 oppositely disposed in an up-down direction of the side frame beam 11, the side frame beam 11, the first cover plate 12 and the second cover plate 13 can jointly surround an accommodation space for accommodating the battery cell 2, the filling layer 5 includes a first filling layer 51 and a second filling layer 52, and the colloid includes potting glue and a double-sided bonding tape.

Before bonding the at least part of the outer surface of the battery cell 2 with the at least part of the inner surface of the battery pack casing 1 through the colloid, the second cover plate 13 is installed on the side frame beam 11, and one side of the battery cell 2 away from the pole end face 21 is bonded to the second cover plate 13 through structural glue.

Bonding at least part of the outer surface of the battery cell 2 with at least part of the inner surface of the battery pack casing 1 through the colloid includes:

the potting glue is coated on the pole end face 21, so that the potting glue can be cured on the pole end face 21 and form the first filling layer 51;

the double-sided bonding tape is bonded onto the first filling layer 51, so that the double-sided bonding tape constitutes the second filling layer 52; and the first cover plate 12 is covered on one side of the side frame beam 11 away from the second cover plate 13, and the first cover plate 12 is made be bonded with one side of the double-sided bonding tape away from the first filling layer 51.

In some examples, the potting glue is made of a polyurethane foam material.

Coating the potting glue on the pole end face 21, so that the potting glue can be cured on the pole end face 21 and form the first filling layer 51 includes:

the potting glue is coated on the pole end face, and nitrogen may be charged into the potting glue through a nitrogen charging device to assist foaming in a coating process of the potting glue, so that the potting glue can be cured under an action of a chemical reaction and gas-assisted foaming to form the first filling layer 51.

In order to make those skilled in the art better understand the technical solutions provided by the examples of the disclosure, a method for manufacturing a battery pack provided by the example of the disclosure will be described in detail below.

FIG. 7 is another method for manufacturing a battery pack provided by an example of the disclosure. The method includes:

S601, installing a barrier assembly 3 on a battery cell 2, so that the barrier assembly 3, a pole end face 21 and an inner surface of a battery pack casing 1 can jointly define an exhaust channel 4 for accommodating an explosion-proof valve;

S602, installing a second cover plate 13 on a side frame beam 11, and one side of the battery cell 2 away from the pole end face 21 is bonded to the second cover plate 13 through structural glue;

S603, covering the first cover plate 12 on one side of the side frame beam 11 away from the second cover plate 13;

S604, injecting potting glue mixed with nitrogen or air into a space between the first cover plate 12 and the pole end face 21 through a glue potting hole 121, so that the at least part of the potting glue can be foamed and cured between the first cover plate 12 and the pole end face 21 under an action of a chemical reaction and gas-assisted foaming to form a filling layer 5.

Through the above manufacturing method, the barrier assembly 3 is installed on the battery cell 2, so that the barrier assembly 3, the pole end face 21 and the inner surface of the battery pack casing 1 can jointly define the exhaust channel 4 for accommodating the explosion-proof valve. The exhaust channel 4 can exhaust the explosion-proof valve 22 of the battery cell 2 to ensure safety of the battery cell 2. The barrier assembly 3 is installed on the battery cell 2 first, and the exhaust channel 4 can be reserved in advance so as to prevent the subsequent potting glue from entering the exhaust channel 4 and affecting the exhaust channel 4. Installing the second cover plate 13 on the side frame beam 11 and bonding the battery cell 2 to the second cover plate 13 can improve connection stability between the battery cell 2 and the second cover plate 13 and ensure that the battery cell 2 will not be displaced or shaken during subsequent machining. After the first cover plate 12 is covered on the side frame beam 11, the potting glue mixed with the nitrogen or the air is injected into the space between the first cover plate 12 and the pole end face 21 through the glue potting hole 121, so that the at least part of the potting glue can be foamed and cured between the first cover plate 12 and the pole end face 21 under an action of the nitrogen and a chemical reaction to form the filling layer 5, the first cover plate 12, the filling layer 5, the battery cell 2 and the second cover plate 13 constitute as a whole, and have a good force transferring path, so as to increase the overall strength and load-bearing capacity of the battery pack.

FIG. 8 is another method for manufacturing a battery pack provided by an example of the disclosure. The method includes:

S701, installing a barrier assembly 3 on a battery cell 2, so that the barrier assembly 3, a pole end face 21 and an inner surface of a battery pack casing 1 can jointly define an exhaust channel 4 for accommodating an explosion-proof valve;

S702, installing a second cover plate 13 on a side frame beam 11, and bond one side of the battery cell 2 away from the pole end face 21 to the second cover plate 13 through structural glue;

S703, coating potting glue on the pole end face 21, and nitrogen may be charged into the potting glue through a nitrogen charging device to assist foaming in a coating process of the potting glue, so that the potting glue can be cured under an action of a chemical reaction and gas-assisted foaming to form a first filling layer 51;

S704, bonding a double-sided bonding tape onto the first filling layer 51, so that the double-sided bonding tape constitutes a second filling layer 52;

S705, covering the first cover plate 12 on one side of the side frame beam 11 away from the second cover plate 13, and the first cover plate 12 is made be bonded with one side of the double-sided bonding tape away from the first filling layer 51.

Through the above manufacturing method, the barrier assembly 3 is installed on the battery cell 2, so that the barrier assembly 3, the pole end face 21 and the inner surface of the battery pack casing 1 can jointly define the exhaust channel 4 for accommodating the explosion-proof valve. The exhaust channel 4 can exhaust the explosion-proof valve 22 of the battery cell 2 to ensure the safety of the battery cell 2. The barrier assembly 3 is installed on the battery cell 2 first, and the exhaust channel 4 can be reserved in advance, so as to prevent the subsequent potting glue from entering the exhaust channel 4 and affecting the exhaust channel 4. Installing the second cover plate 13 on the side frame beam 11 and bonding one side of the battery cell 2 away from the pole end face 21 to the second cover plate 13 through the structural glue can improve connection stability between the battery cell 2 and the second cover plate 13 and ensure that the battery cell 2 will not be displaced or shaken during subsequent machining. Directly coating the potting glue on the pole end face 21 can monitor a position and state of the potting glue intuitively. The potting glue can foam and cure under the action of the nitrogen and its own chemical reaction to form the first filling layer 51. The double-sided bonding tape is bonded to the first filling layer 51, so that the double-sided bonding tape constitutes the second filling layer 52. The first cover plate 12 is covered on one side of the side frame beam 11 away from the second cover plate 13, the first cover plate 12 is bonded to one side of the double-sided bonding tape away from the first filling layer 51, and the first filling layer 51 and the second filling layer 52 can be stably filled between the pole end face 21 of the battery cell 2 and the first cover plate 12, so that the first cover plate 12, the second filling layer 52, the first filling layer 51, the battery cell 2 and the second cover plate 13 constitute as a whole and has a good force transferring path, so as to increase the overall strength and load-bearing capacity of the battery pack.

A third aspect of the disclosure provides a vehicle including the above battery pack or a battery pack manufactured by the above method for manufacturing the battery pack.

The preferred implementations of the disclosure are described above in detail with reference to the accompanying drawings. However, the disclosure is not limited to the specific details in the above implementations. Within the scope of the technical concept of the disclosure, various simple modifications can be made to the technical solutions of the disclosure, and these simple modifications belong to the protection scope of the disclosure.

In addition, it should be noted that all the specific technical features described in the above specific implementations can be combined in any suitable manner unless they are inconsistent. Various possible combination manners are not illustrated in the disclosure in order to avoid unnecessary repetition.

In addition, the various different implementations of the disclosure can also be combined arbitrarily, as long as they do not violate the idea of the disclosure, and they should also be regarded as the content disclosed in the disclosure.

The invention claimed is:

1. A battery pack, comprising:
a battery pack casing;
a battery cell, located in the battery pack casing, that includes a pole end face and an explosion-proof valve on the pole end face;
a barrier assembly, installed on the battery cell that is located between the pole end face and an inner surface of the battery pack casing, wherein the inner surface of the battery pack casing, the pole end face and the barrier assembly jointly define an exhaust channel, and the explosion-proof valve is in the exhaust channel; and
a filling layer, that is located outside the exhaust channel that fills a gap between at least part of an outer surface of the battery cell and at least part of the inner surface of the battery pack casing, wherein the filling layer is made of an adhesive colloid, so that the at least part of the outer surface of the battery cell is bonded with the at least part of the inner surface of the battery pack casing through the filling layer; and
at least one battery cell group, each of the at least one the battery cell group comprises:
a plurality of the battery cell, arrayed in a first direction of the battery pack casing and respective explosion-proof valves of the plurality of the battery cell in the battery cell group are arranged at intervals in the first direction;
a barrier assembly arranged in one-to-one correspondence with the battery cell group, the barrier assembly comprises partition plates, the partition plates extend in the first direction, and two partition plates are respectively on two sides of the respective explosion-proof valves of each of the plurality of the battery cell in the battery cell groups in a second direction perpendicular to the first direction; and wherein two ends of the partition plates in the first direction respectively abut against the inner surface of the battery pack casing.

2. The battery pack according to claim 1, wherein the barrier assembly further comprises end plates, the end plates extend in the second direction, two end plates are respectively on two sides of the respective explosion-proof valves of each of the plurality of the battery cell in the battery cell group in the first direction; and
the two partition plates and the two end plates constitute an annular closed structure surrounding the respective explosion-proof valves in the battery cell group.

3. The battery pack according to claim 1, wherein a bonding glue is on one side of the barrier assembly close to the explosion-proof valve and the assemblies are bonded to side portions of the explosion-proof valve through the bonding glue.

4. The battery pack according to claim 1, wherein a bonding glue is on one side of the barrier assembly close to the pole end face, and the barrier assemblies are bonded to the pole end face through the bonding glue.

5. The battery pack according to claim 1, wherein the battery pack casing comprises a side frame beam, and a first cover plate and a second cover plate oppositely in an up-down direction of the side frame beam, the side frame beam, the first cover plate and the second cover plate jointly surround an accommodation space for accommodating the battery cell, the explosion-proof valves are close to the first cover plate, at least part of the filling layer is between the first cover plate and the pole end face, and one end of the battery cell away from the pole end face is bonded to the second cover plate through structural glue.

6. The battery pack according to claim 5, wherein a glue potting hole is in the first cover plate, the adhesive colloid is a potting glue, and the glue potting hole is used for injecting the potting glue into a space between the first cover plate and the pole end face, so that the at least part of the potting glue can be cured between the first cover plate and the pole end face to form the filling layer.

7. The battery pack according to claim 5, wherein an observation hole is in the first cover plate, and the observation hole is close to the side frame beam.

8. The battery pack according to claim 5, wherein the filling layer comprises a first filling layer and a second filling layer, the adhesive colloid comprises a potting glue and a double-sided bonding tape, and the pole end face is coated with the potting glue, so that the potting glue can be cured on the pole end face and form the first filling layer; and one side of the double-sided bonding tape is bonded with the first filling layer, a second side of the double-sided bonding tape is bonded with the first cover plate, and the double-sided bonding tape constitutes the second filling layer.

9. The battery pack according to claim 6, wherein the potting glue is made of a material with a density of 0.2 g/cm3 to 0.7 g/cm3, a bonding strength of 0.5 MPa to 2 MPa, and an elastic modulus of 0.1 MPa to 200 MPa.

10. The battery pack according to claim 9, wherein the potting glue is made of a polyurethane foam material.

11. The battery pack according to claim 9, wherein a heat-resistant material is added to the potting glue, so that a heat conductivity of the potting glue can be equal to or lower than 0.1 W/mK.

12. A method for manufacturing a battery pack, wherein the battery pack comprises a battery pack casing, a battery cell and a barrier assembly, the battery cell has a pole end face and an explosion-proof valve on the pole end face, and the method for manufacturing the battery pack comprises:

installing the barrier assembly on the battery cell, so that the barrier assembly, the pole end face and an inner surface of the battery pack casing can jointly define an exhaust channel for accommodating the explosion-proof valve; and bonding at least part of an outer surface of the battery cell with at least part of the inner surface of the battery pack casing through a colloid, so that the colloid can form a filling layer located outside the exhaust channel between the at least part of the outer surface of the battery cell and the at least part of the inner surface of the battery pack casing;

wherein the battery pack further comprises at least one battery cell group, each of the at least one the battery cell group comprises:

a plurality of the battery cell, arrayed in a first direction of the battery pack casing and respective explosion-proof valves of the plurality of the battery cell in the battery cell group are arranged at intervals in the first direction;

a barrier assembly arranged in one-to-one correspondence with the battery cell group, the barrier assembly comprises partition plates, the partition plates extend in the first direction, and two partition plates are respectively on two sides of the respective explosion-proof valves of each of the plurality of the battery cell in the battery cell groups in a second direction perpendicular to the first direction; and wherein two ends of the partition plates in the first direction respectively abut against the inner surface of the battery pack casing.

13. The method for manufacturing the battery pack according to claim 12, wherein installing the barrier assembly on the battery cell comprises:

disposing a first bonding glue on one side of the barrier assembly close to the explosion-proof valve, and making the barrier assembly be bonded to a side portion of the explosion-proof valve through the first bonding glue; and/or disposing a second bonding glue on one side of the barrier assembly close to the pole end face, and making the barrier assembly be bonded to the pole end face through the second bonding glue.

14. The method for manufacturing the battery pack according to claim 12, wherein the battery pack casing comprises a side frame beam, and a first cover plate and a second cover plate oppositely in an up-down direction of the side frame beam, the side frame beam, the first cover plate and the second cover plate can jointly surround an accommodation space for accommodating the battery cell, a glue potting hole is in the first cover plate, and the colloid is a potting glue;

before bonding the at least part of the outer surface of the battery cell with the at least part of the inner surface of the battery pack casing through the colloid, installing the second cover plate on the side frame beam, and bonding one side of the battery cell away from the pole end face to the second cover plate through structural glue; and bonding the at least part of the outer surface of the battery cell with the at least part of the inner surface of the battery pack casing through the colloid comprises:

covering the first cover plate on one side of the side frame beam away from the second cover plate; and

injecting the potting glue into a space between the first cover plate and the pole end face through the glue potting hole, so that the at least part of the potting glue can be cured between the first cover plate and the pole end face to form the filling layer.

15. The method for manufacturing the battery pack according to claim 14, wherein the potting glue is made of a polyurethane foam material; and injecting the potting glue into the space between the first cover plate and the pole end face through the glue potting hole, so that the at least part of the potting glue can be cured between the first cover plate and the pole end face to form the filling layer comprises:

injecting the potting glue mixed with nitrogen or air into the space between the first cover plate and the pole end face through the glue potting hole, so that the at least part of the potting glue can be foamed and cured between the first cover plate and the pole end face under an action of a chemical reaction and gas-assisted foaming to form the filling layer.

16. The method for manufacturing the battery pack according to claim 13, wherein the battery pack casing comprises a side frame beam, and a first cover plate and a second cover plate oppositely in an up-down direction of the side frame beam, the side frame beam, the first cover plate and the second cover plate can jointly surround an accommodation space for accommodating the battery cell, the filling layer comprises a first filling layer and a second filling layer, and the colloid comprises a potting glue and a double-sided bonding tape;

before bonding the at least part of the outer surface of the battery cell with the at least part of the inner surface of the battery pack casing through the colloid, installing the second cover plate on the side frame beam, and bonding one side of the battery cell away from the pole end face to the second cover plate through structural glue; and bonding the at least part of the outer surface of the battery cell with the at least part of the inner surface of the battery pack casing through the colloid comprises:

coating the potting glue on the pole end face, so that the potting glue can be cured on the pole end face and form the first filling layer;

bonding the double-sided bonding tape onto the first filling layer, so that the double-sided bonding tape constitutes the second filling layer; and covering the first cover plate on one side of the side frame beam away from the second cover plate, and making the first cover plate be bonded with one side of the double-sided bonding tape away from the first filling layer.

17. The method for manufacturing the battery pack according to claim 16, wherein the potting glue is made of a polyurethane foam material; and coating the potting glue on the pole end face, so that the potting glue can be cured on the pole end face and form the first filling layer comprises:

coating the potting glue on the pole end face, and charging nitrogen into the potting glue through a nitrogen charging device to assist foaming in a coating process of the potting glue, so that the potting glue can be cured under an action of a chemical reaction and assisted foaming of the nitrogen to form the first filling layer.

18. A vehicle, comprising a battery pack, the battery pack comprising:

a battery pack casing;

a battery cell, located in the battery pack casing, and having a pole end face and an explosion-proof valve on the pole end face;

a barrier assembly, installed on the battery cell and between the pole end face and an inner surface of the battery pack casing, wherein the inner surface of the battery pack casing, the pole end face and the barrier assembly jointly define an exhaust channel, and the explosion-proof valve is in the exhaust channel; and a filling layer, being outside the exhaust channel and used for filling a gap between at least part of an outer surface of the battery cell and at least part of the inner surface of the battery pack casing, wherein the filling layer is made of an adhesive colloid, so that the at least part of the outer surface of the battery cell can be bonded with the at least part of the inner surface of the battery pack casing through the filling layer;

wherein the battery pack further comprises at least one battery cell group, each of the at least one the battery cell group comprises:

a plurality of the battery cell, arrayed in a first direction of the battery pack casing and respective explosion-proof valves of the plurality of the battery cell in the battery cell group are arranged at intervals in the first direction;

a barrier assembly arranged in one-to-one correspondence with the battery cell group, the barrier assembly comprises partition plates, the partition plates extend in the first direction, and two partition plates are respectively on two sides of the respective explosion-proof valves of each of the plurality of the battery cell in the battery cell groups in a second direction perpendicular to the first direction; and wherein two ends of the partition plates in the first direction respectively abut against the inner surface of the battery pack casing.

\* \* \* \* \*